United States Patent [19]

Suzuki et al.

[11] 4,265,480
[45] May 5, 1981

[54] PASSIVE SEATBELT SYSTEM

[75] Inventors: Ichiro Suzuki; Masanao Motonami; Hisashi Ogawa, all of Aichi, Japan

[73] Assignee: Toyota Jidosha Kogyo Kabushiki Kaisha, Aichi, Japan

[21] Appl. No.: 33,055

[22] Filed: Apr. 25, 1979

[30] Foreign Application Priority Data

Aug. 17, 1978 [JP] Japan .................. 53-113245[U]

[51] Int. Cl.³ .............................................. B60R 21/10
[52] U.S. Cl. .................................. 280/803; 16/96 R; 297/4
[58] Field of Search ................ 280/804, 803, 802; 180/270, 268; 297/482, 483, 469; 74/30, 29; 16/93 D, 93 R, 95 R, 95 D, 96 R; 104/93, 89, 110, 106, 165

[56] References Cited

U.S. PATENT DOCUMENTS

| | | | |
|---|---|---|---|
| 2,966,695 | 1/1961 | Dwyer | 16/93 DS |
| 3,606,448 | 9/1971 | Walker | 296/105 |
| 3,860,260 | 1/1975 | Kazaoka et al. | 280/803 |
| 4,004,829 | 1/1977 | Kato | 280/802 |
| 4,061,365 | 12/1977 | Nagano | 280/804 |
| 4,070,040 | 1/1978 | Igeta | 280/804 |

FOREIGN PATENT DOCUMENTS 2445688  4/1976  Fed. Rep. of Germany ........... 280/804

*Primary Examiner*—John A. Pekar
*Attorney, Agent, or Firm*—Koda and Androlia

[57] ABSTRACT

A passive seatbelt system which includes a runner piece which anchors the upper end of a passenger restraining belt which is guided by a guide rail fastened to a vehicle body and which is moved so that the belt is automatically fastened or removed from a passenger. The guide rail includes a base part which is fastened to the vehicle body and a pair of guide arms which hold the runner piece in a space between the guide arms and the base part whereby the runner piece is securely held during a vehicular emergency.

10 Claims, 10 Drawing Figures

PASSIVE SEATBELT SYSTEM

BACKGROUND OF THE INVENTION

1. Field of Invention

This invention relates to passive seatbelt systems and more particularly to passive seatbelt systems which automatically fasten and unfasten the restraining belt from a passenger.

2. Prior Art

Seatbelt systems restrain passengers and prevent them from colliding with dangerous objects during vehicular emergencies. As a result, such systems make it possible to achieve a conspicuous improvement in passenger safety. In spite of this fact, however, the percentage of passengers who wear seatbelts is extremely low because of the difficulty in donning seatbelts, etc. As a result, various types of passive seatbelt systems have been proposed which make it possible to automatically fasten the belt around the passenger after the passenger has seated himself in the vehicle.

Among these systems, passive seatbelt systems which automatically fasten the belt around the passenger and remove the belt from around the passenger by the use of the driving force of a motor, etc., to move a runner piece which anchors the outer end of the belt have been highly rated because of their reliable operation. In such passive seatbelt systems, the tension on the belt is transmitted to the vehicle body via the runner piece. It is therefore necessary that the guide rail which serves as a guide part for the runner piece be of sufficient strength. However, in cases where a large, strong guide rail is used, the projection of parts of the passive seatbelt system into the passenger compartment decreases the passenger space in the vehicle and is dangerous in that it increases the possibility of a passenger colliding with the projecting portions during a vehicular emergency.

SUMMARY OF THE INVENTION

Accordingly, it is a general object of the present invention to provide a passive seatbelt system which has a strong, compact guide rail and which is able to provide secure support for the runner piece.

It is still another object of the present invention to provide a passive seatbelt system which is easy to install.

In keeping with the principals of the present invention, the objects are accomplished by a unique passive seatbelt system which includes a runner piece which anchors the outer end of a passenger restraining belt which is guided by a guide rail fastened to the vehicle body and which is moved so that the belt is automatically fastened or removed from the passenger. The guide rail includes a base part which is fastened to the vehicle body and a pair of guide arms which hold the runner piece in a space between the guide arms and the base part whereby the runner piece is securely held during a vehicular emergency.

BRIEF DESCRIPTION OF THE DRAWINGS

The above-mentioned features and objects of the present invention will become more apparent with reference to the following description taken in conjunction with the accompanying drawings wherein like referenced numerals denote like elements and in which.

DETAILED DESCRIPTION OF THE INVENTION

Figure 1:
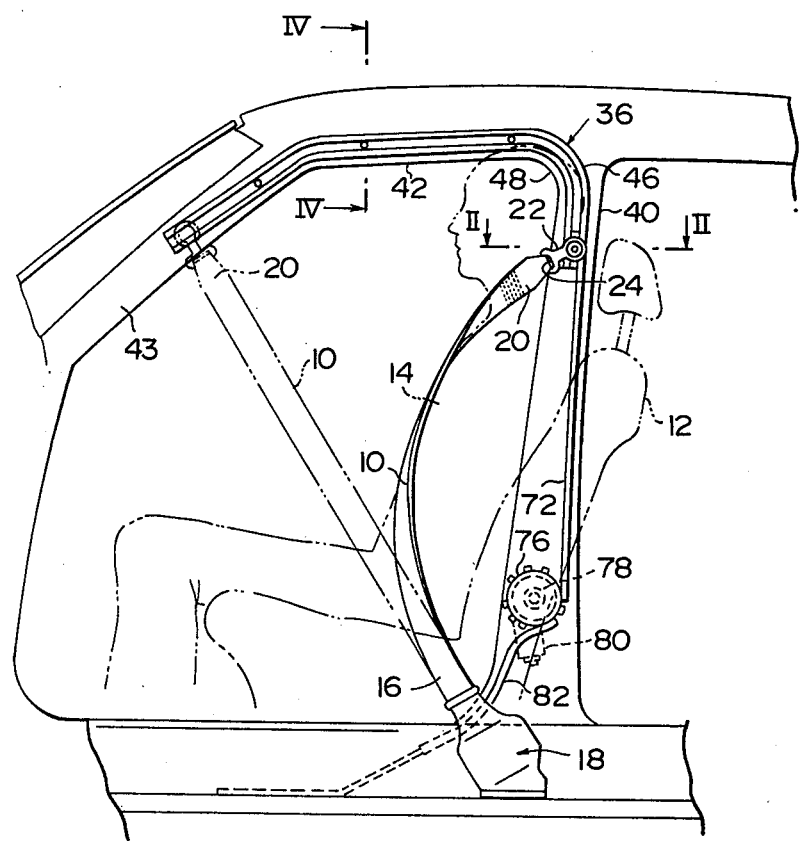
FIG. 1 is a side view from the vehicle interior which illustrates a first embodiment of a passive seatbelt system in accordance with the teachings of the present invention.

Referring more particularly to the figures, shown in FIG. 1 is a first embodiment of a passive seatbelt system in accordance with the teachings of the present invention. In FIG. 1 the passive seatbelt system includes a passenger restraining belt 10 fastened diagonally across the passenger 14 who is seated in the passenger seat 12. The inner end 16 of the belt 10 is power retracted by a retractor mechanism 18 which is fastened to the floor of the vehicle. This retractor mechanism 18 is a so-called emergency locking retractor containing an inertial locking mechanism which allows extension of the belt 10 against the retracting force under normal vehicle operation but which abruptly stops extension of the belt 10 during a vehicular emergency.

Figure 2:
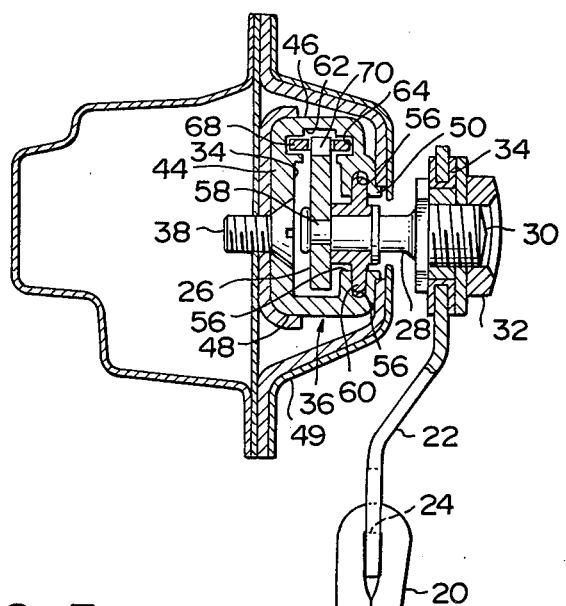
FIG. 2 is a cross-sectional view along the line II—II in FIG. 1.
Figure 3:
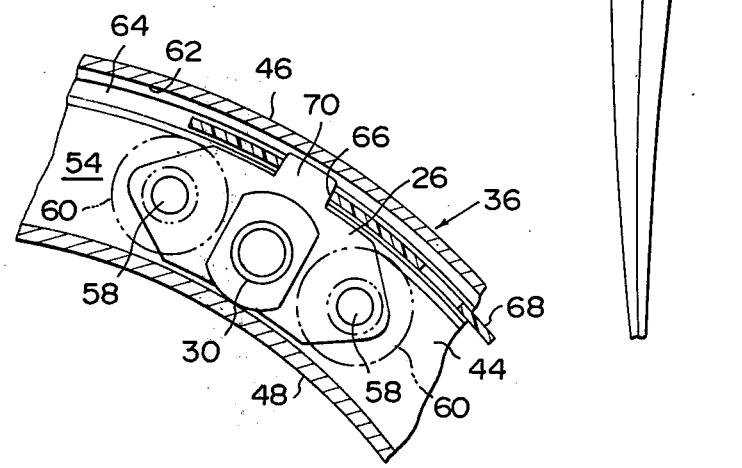
FIG. 3 is a cross-sectional view which illustrates the structure of the bent portion of the guide rail.
Figure 4:
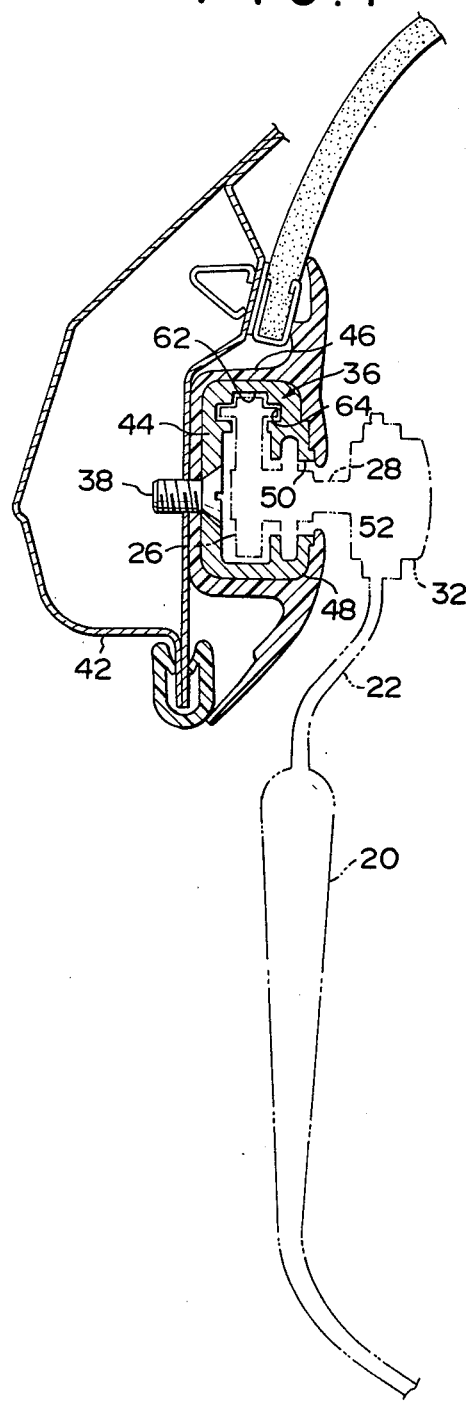
FIG. 4 is a cross-section along the line IV—IV in FIG. 1.

The outer end 20 of the belt 10 is anchored by being folded back on itself through a slot 24 in an anchor plate 22. The anchor plate 22 is fastened to an anchor shaft 28 which is attached to a runner piece 26, as shown in FIGS. 2 and 3. The anchor plate 22 is fastened to the anchor shaft 28 by fitting the anchor plate 22 over the anchor bolt 30 formed on the anchor shaft 28 and then tightening down a nut 32 on the anchor bolt 30. A spacer 34 is interposed between the anchor bolt 30 and the interior of the bolt hole in the anchor plate 22 so that the anchor plate 22 can rotate about the bolt 30.

As is shown in FIG. 3, the anchor shaft 28 is attached to the approximate center of the runner piece 26. Furthermore, the runner piece 26 is provided inside a guide rail 36, as shown in FIG. 2. The guide rail 36 includes a base part 44 and a pair of guide arms 46 and 48 which are formed integral with the base part 44. The base part of the guide rail 36 is fastened by means of screws 38 to the center pillar 40, roof side member 42 and front pillar 43 of the vehicle body. Each of the guide arm parts 46 and 48 is integrally connected at one end to the edge of the base part 44 with the guide arm part 46 being connected to the top edge and the guide arm part 48 connected to the bottom edge. The guide arm parts 46 and 48 are further connected to the base part 44 so that the guide arm parts 46 and 48 project into the vehicle interior. The guide arm parts 46 and 48 are both bent at an intermediate point so that they are roughly L-shaped in cross-section. Furthermore, the tip ends 50 and 52 of the parts 46 and 48 face each other with a narrow gap therein between. Furthermore, the guide rail is designed so that the screws 38 are easily tightened down and such that the strength of the guide rail 36 is increased.

As a result of the above-described design, a housing space 54 for the runner piece 26 is formed inside the guide rail 36. This housing space 54 connects with the vehicle interior via the gap between the tips 50 and 52. The anchor shaft 28 passes through the gap and the screws 38 project to the outside of the guide rail 36. Furthermore, grooves 56 are formed in the tip ends 50 and 52 of the guide parts 46 and 48 along the length of the guide rail 36 in order to form guide parts.

In addition, as is shown in FIG. 3, a pair of shafts 58 which project towards the vehicle interior are attached to the runner piece 26 on either side of the anchor shaft 28. Wheels 60, which constitute contact guide parts, are mounted on the shafts 58. The wheels 60 are accommodated so that they can roll in the grooves 56. The wheels 60 guide the runner piece 26 along the guide rail 36.

Figure 5:
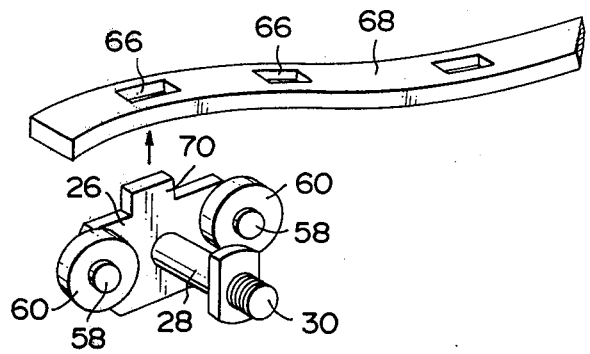
FIG. 5 is a partial oblique view which illustrates the thick tape.
Figure 6:
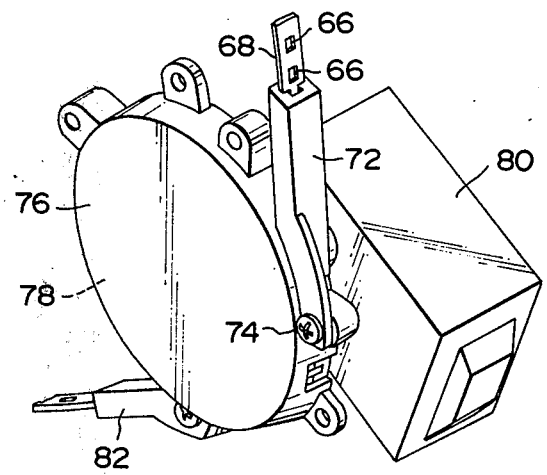
FIG. 6 is an oblique view illustrating the sprocket wheel.
Figure 7:
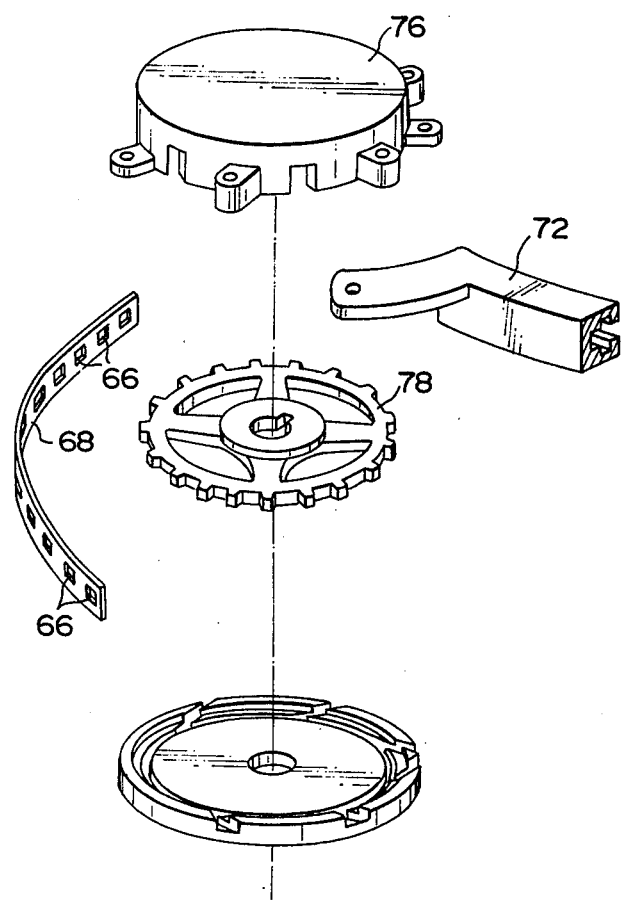
FIG. 7 is an exploded oblique view of FIG. 6.

Furthermore, in the guide rail part 46 is cut a rectangular groove 62 which communicates with the housing space 54. Two slide grooves 64 which substantially increase the width of the rectangular groove 62 are formed at an intermediate depth in both walls of the rectangular groove 62. A thick tape 68 made of preferably a synthetic resin and which has a multiple number of rectangular openings 66 formed at appropriate intervals along its entire length as shown in FIG. 5 is inserted into the side grooves 64 so that it can move through said slide grooves 64. As is shown in FIG. 3, a projection 70 which projects from the central part of the runner piece 26 towards the guide part 46 is inserted into one of the openings 66 and the thick tape 68. Accordingly, the runner piece 26 moves along with the thick tape 68. Since the runner piece 26 is thus connected with the thick tape 68 by the installation of the projection 70 on one edge of the runner piece 26, the length of the anchor shaft 28 from the runner piece 26 to the anchor bolt 30 can be reduced. As a result, the projection of the shaft 28 in the passenger compartment can also be reduced.

However, in cases where the thick tape 68 is connected to the runner piece 26 at a point other than at the axis of rotation of a wheel 60, there is a possibility that the rotational momentum applied to the runner piece 26 by the thick tape 68 will cause wheel 60 to stick in the grooves 56. In this embodiment, however, two wheels are installed and as a result the runner piece 26 can move smoothly through the guide rail 36.

As shown in FIG. 1, the central portion of the guide rail 36 constructed as decribed above is fastened to the roof side member 42 and is oriented in a roughly horizontal direction. The front end of the guide rail 36 drops diagonally along the front pillar 43 of the vehicle while the rear end of the guide rail 36 drops vertically along the center pillar 40 of the vehicle and ends at an intermediate point on the center pillar 40.

An extension 72 containing the rectangular groove 62 and slide grooves 64 is extended vertically downward from the rear end of the guide rail 36 and connects to a sprocket housing 76 which is fastened by means of fastening screws 74 to the lower part of the center pillar 40. A sprocket wheel 78 is mounted inside the sprocket housing 76. The sprocket wheel 78 engages with the opening 66 in thick tape 68 which is passed through the extension 72. Furthermore, the sprocket wheel 78 is connection with and driven by a reversible motor 80 which is installed within the center pillar 40. This reversible motor is used to drive the thick tape 68 via the sprocket wheel 78. In other words, when a passenger opens the door, in order to enter or leave the vehicle, the sprocket wheel 78 is caused to complete a specified number of revolutions in a counterclockwise direction with respect to FIG. 1; and when the passenger closes the door after seating himself in the vehicle, the sprocket wheel 78 is caused to complete a specified number of revolutions in a clockwise direction.

In addition, a slide rail 82 which is substantially the same shape as the extension 72 is connected to the sprocket housing 76. This slide rail 82 accommodates the thick tape 68 that is pushed out of the sprocket housing 76.

In operation and as shown in FIG. 1, the passenger is seated in the vehicle and is wearing the belt 10. The belt 10 is fastened diagonally across the passenger 14. In this case, under normal vehicle operating conditions, the belt 10 is retraced only by the retracting force of the retractor mechanism 18. Accordingly, when the passenger wants to change his driving posture, the belt 10 can be extended from the retractor mechanism 18 against the retracting force of the retractor mechanism 18. As a result, the passenger 14 is able to achieve a comfortable driving posture.

If the vehicle is involved in an emergency such as as a collision, etc., the inertial locking mechanism in the retractor mechanism 18 abruptly stops the extension of the inner end 16 of the belt 10. Accordingly, the passenger 14 is securely restrained by the belt 10 so that his safety is insured. In this case, the large tension applied to the belt 10 by the passenger acts on the outer end 20 of the belt 10. As a result, there is a possibility of damage to the wheels 60. However, since the movement of the runner piece 26 towards the vehicle interior is checked by the guide arms 46 and 48, the belt tension acting on the outer end 20 of the belt 10 is securely transmitted to the center pillar 40 so that the safety of the passenger is insured. In this embodiment, furthermore, the rear end of the guide rail 36 is oriented vertically along the center pillar 40. As a result, there is no movement of the runner piece 26 along the length of the guide rail 36 and there is no danger that the belt 10 will become unfastened.

Next, when the passenger opens the door in order to leave the vehicle, the motor 80 causes the sprocket wheel 78 to rotate in a counterclockwise direction with respect to FIG. 1. This causes the thick tape 68 to be pushed out of the sprocket housing 76 into the extension 72 so that the thick tape 68 receives a compressive force. As a result, the rotational force of the sprocket wheel 78 is transmitted to the runner piece 26. Accordingly, the runner piece 26 is caused to move through the guide rail 36 towards the front of the vehicle along the center pillar 40, roof side member 52 and front pillar 43 until the runner piece 26 reaches the position indicated by the two-dot chain line in FIG. 1. As a result, a substantial space for the passenger 14 to leave the vehicle is formed between the belt 10 and the passenger seat 12 and the passenger 14 can easily leave the vehicle.

Furthermore, when the passenger closes the door after reentering the vehicle and seating himself in the passenger seat, the motor 80 is reversed and the belt 10 is caused to move once again into the position indicated by the solid line in FIG. 1. As a result, the belt 10 is fastened securely around the passenger. Furthermore, since two wheels 60 are installed, the movement of the runner piece 26 along the guide rail 36 is very smooth and the runner piece 26 can always be caused to move along the guide rail 36 with a high degree of reliability. In particular, even in cases where intermediate portions of the guide rail 36 are bent as they are in this embodiment, the runner piece 26 can be easily caused to move.

In practice, it should be apparent that the opening and closing of the door and the seating of a passenger on the seat can be detected by conventional means and that the motor 80 can be made to respond to such conventional detection means.

Figure 8:
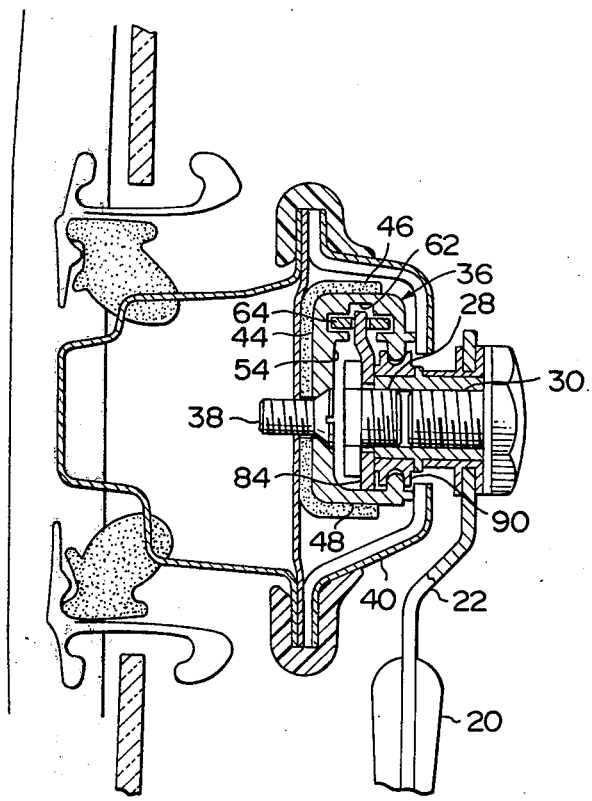
FIG. 8 is a cross-sectional view corresponding to FIG. 2 which illustrates a second embodiment of the present invention.
Figure 10:
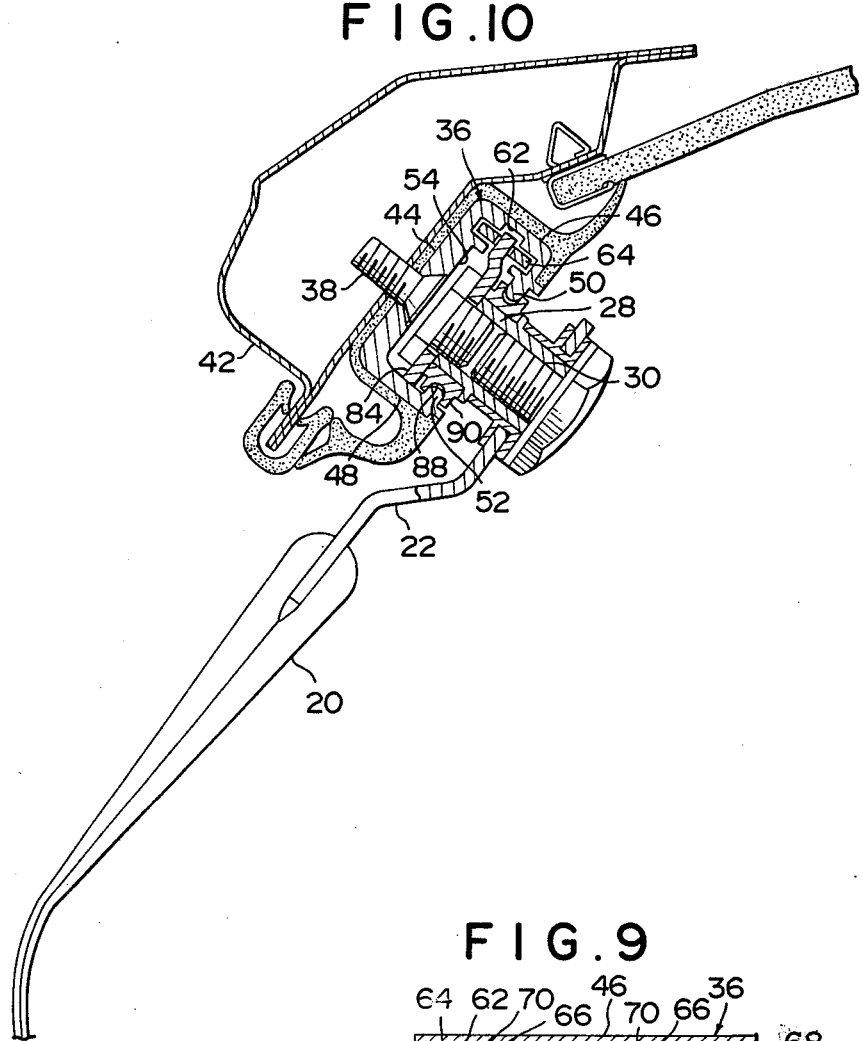
FIG. 10 is a cross-sectional view corresponding to FIG. 4 which illustrates the second embodiment of the present invention.
Figure 9:
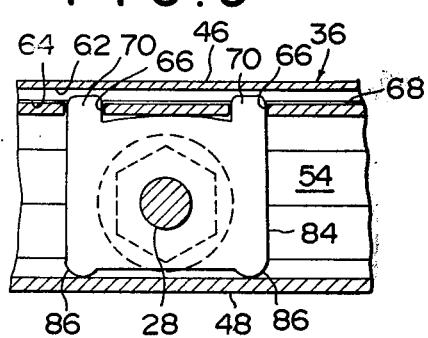
FIG. 9 is a cross-sectional view corresponding to FIG. 3 which illustrates the second embodiment of the present invention.

Referring to FIGS. 8 through 10, shown therein is a second embodiment of the present invention. This embodiment, two projections 70 are caused to project from the runner piece 84 and are caused to engage with opening 66 in the thick tape 68. Furthermore, slide projections 86 are caused to project from the runner piece 84 on the opposite side of the runner piece 84 from the projection 70. These slide projections 86 are caused to contact the interior surface of the guide arm 48.

In this embodiment, furthermore, a sliding shoe 90 which has grooves 88 formed in its outside edges is mounted on the anchor shaft 28 attached to the central portion of the runner piece 84. These grooves 88 accommodate the tip ends 50 and 52 of the guide arm parts 46 and 48. Accordingly, in this embodiment, the runner piece 84 can move smoothly through the guide rail 36 without any danger of sticking.

The remaining arrangement of this this second embodiment is substantially the same as that of the first embodiment and like elements are given like referenced numerals and a description of their interconnection and operation will be omitted.

Furthermore, in each of the embodiments described above, this invention has been applied to a seatbelt system having a bent guide rail. However, this invention is not limited to such systems and it can be applied to any seatbelt system in which the belt is automatically fastened around and removed from the passenger by the movement of a runner piece which anchors the outer end of the belt. Furthermore, in the embodiments described above, a thick tape was used as a connecting part in order to connect the runner piece with the motor which was used as a driving mechanism. However, this invention is not limited to such an arrangement and would also be possible to use some other form of connecting part such as a wire, etc.

In the passive seatbelt system provided by this invention and as described above, the base part of the guide rail is fastened to the vehicle body. As a result, the strength is increased. Furthermore, a housing space for the runner piece is formed between the two guide arm parts which are extended from the opposite edges of the base part and the base part. As a result, this invention possesses the following advantages: The assembly of the runner piece and guide rail is reduced in size and the projection of parts of the seatbelt system into the passenger compartment is also reduced. Furthermore, the guide arm parts securely support the runner piece such that the belt tension is transmitted to the vehicle body during a vehicular emergency.

It should be apparent to one skilled in the art that the above-described embodiments are merely illustrative of but a few of the many possible specific embodiments which represent the applications of the principles of the present invention. Numerous and varied other arrangements can be readily devised by those skilled in the art without departing from the spirit and scope of the invention.

We claim:

1. A passive seatbelt system for a motor vehicle which includes a runner piece which anchors one end of a passenger restraining belt, a guide rail fastened to a vehicle body which guides the runner piece, a wheel which is mounted on a side of said runner piece opposite the vehicle body and which contacts said guide rail and driving mechanism which moves said runner piece along the length of said guide rail, said guide rail comprising a base part which is fastened to said vehicle body and a pair of guide arm parts coupled to said base part and which forms a runner piece housing space between said guide arm parts and said base part and said housing space houses said runner piece, said guide arm parts further including guide parts which are in contact with said wheel of said runner piece for guiding said runner piece along the guide rail.

2. A passive seatbelt system according to claim 1, wherein said guide arm parts are roughly L-shaped in a cross section perpendicular to their length.

3. A passive seatbelt system according to claim 1 in which grooves which accommodate a flexible tape are formed in one of said guide arm parts and said flexible tape is coupled between said runner piece and said driving mechanism.

4. A passive seatbelt system according to claim 2, wherein tip ends of said guide arm parts face each other across a narrow gap.

5. A passive seatbelt system according to claim 4, wherein said guide parts are grooves formed along the length of said guide rail in the tip ends of said guide arm parts.

6. A passive seatbelt system according to claim 5, wherein said guide rail is installed so that it is parallel to the longitudinal axis of said vehicle.

7. A passive seatbelt system according to claim 6, wherein an intermediate portion of said guide rail with respect to its length is fastened to a roof side member of said vehicle.

8. A passive seatbelt system according to claim 6, wherein a front end of said guide rail is fastened to said front pillar of said vehicle.

9. A passive seatbelt system according to claim 6 in which the rear end of said guide rail is fastened to a center pillar of said vehicle.

10. A passive seatbelt system according to claim 4, wherein said base part of said guide rail is fastened to said vehicle body by screws which are inserted into the guide rail and vehicle body through said gap between the tip ends of said guide arm parts.

* * * * *